(No Model.) 2 Sheets—Sheet 1.
J. HEUERMANN.
ROAD GRADER.
No. 541,546. Patented June 25, 1895.
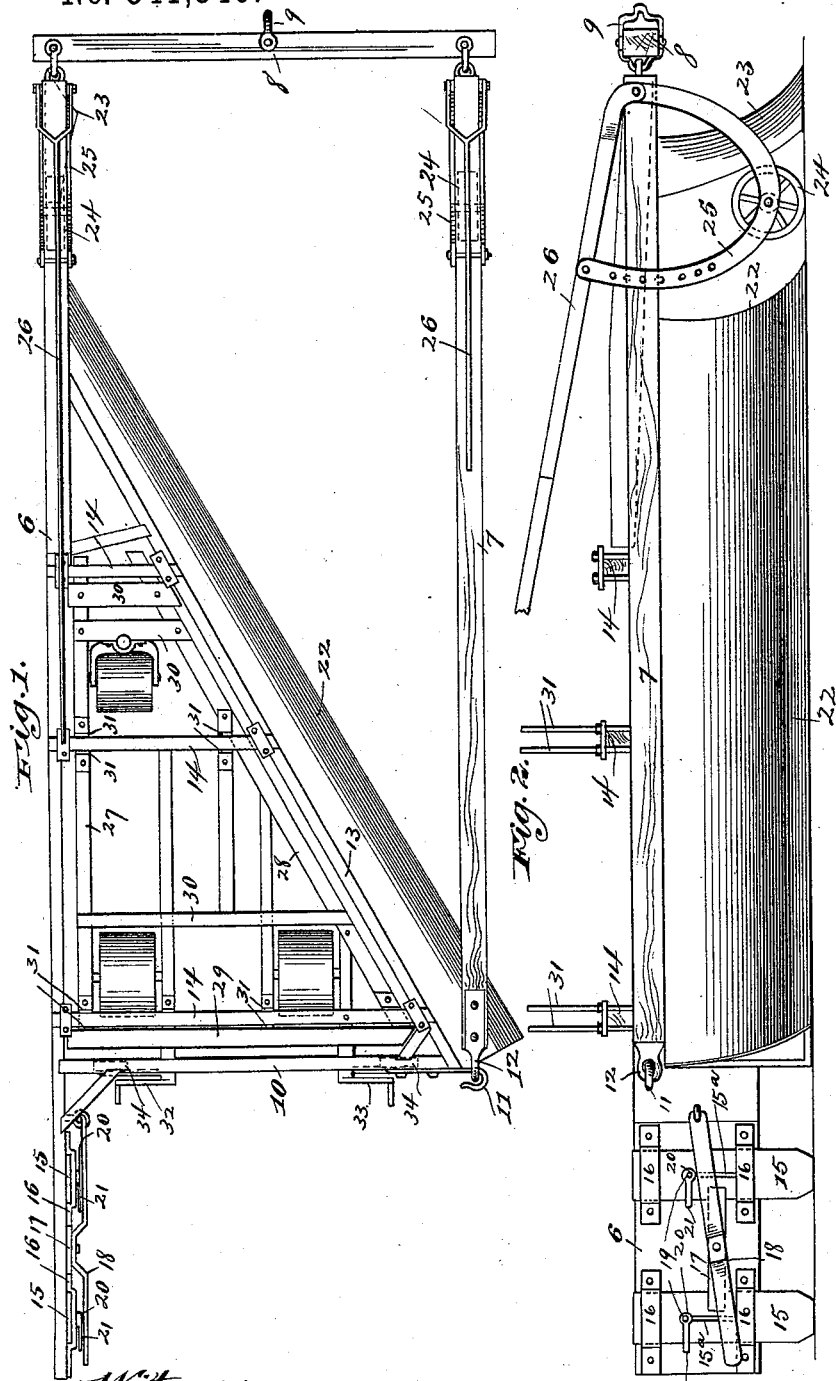

(No Model.) 2 Sheets—Sheet 2.

J. HEUERMANN.
ROAD GRADER.

No. 541,546. Patented June 25, 1895.

Witnesses: Inventor,

UNITED STATES PATENT OFFICE.

JOHN HEUERMANN, OF OAK PARK, ILLINOIS.

ROAD-GRADER.

SPECIFICATION forming part of Letters Patent No. 541,546, dated June 25, 1895.

Application filed September 29, 1894. Serial No. 524,421. (No model.)

*To all whom it may concern:*

Be it known that I, JOHN HEUERMANN, of Oak Park, in the county of Cook and State of Illinois, have invented certain new and useful Improvements in Road-Graders, of which the following is a specification.

This invention relates to a machine intended for grading or leveling earth surfaces, and is particularly adapted for filling sewer trenches.

The machine comprises a truck having carrying wheels and adapted to support thereon an adjustable frame which carries a plow or scraper, and also a colter and an adjustable landside. Suitable lifting levers are fulcrumed upon the truck frame and adapted to engage the scraper frame whereby to lift or tilt the latter, and the truck frame is also provided with standards forming guides for the scraper frame, and said standards are provided with pin holes or other means for sustaining the scraper frame in its adjusted position.

Figure 3:
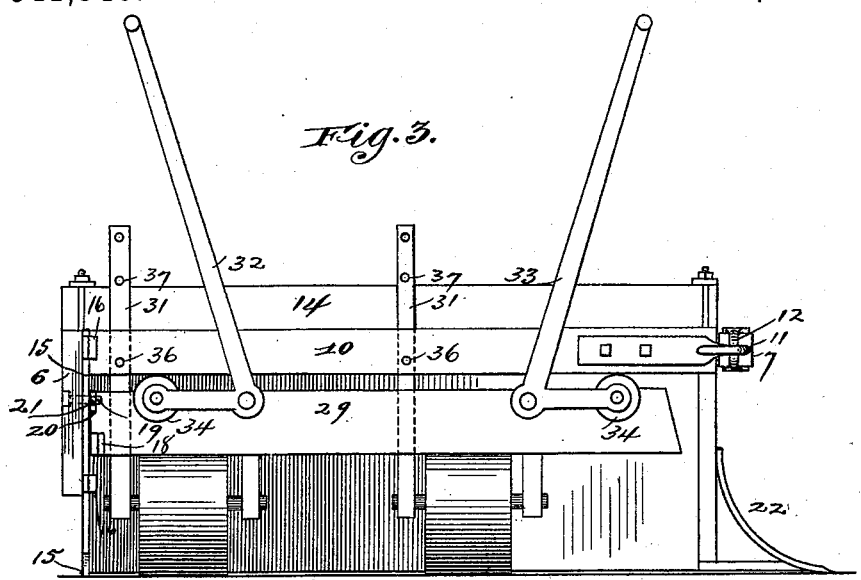
Figure 4:
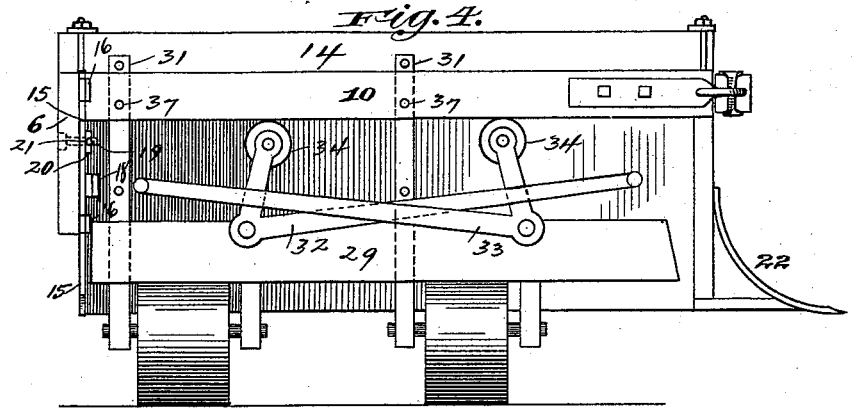
Figure 5:
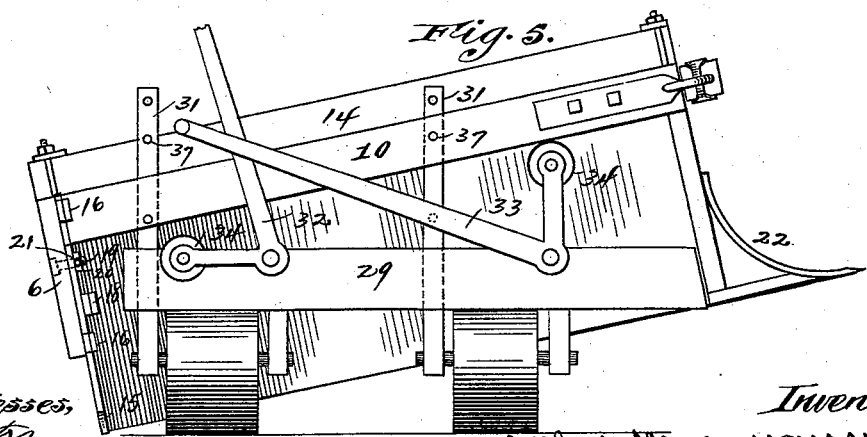

In the accompanying drawings, Figure 1 is a plan view. Fig. 2 is a side elevation. Figs. 3, 4, and 5 are rear elevations showing, respectively, an operative position, the scraper-frame raised as for transportation, and the scraper-frame tilted for passing an obstruction or operating upon a bank of earth.

In the drawings, 6, 7 represent the side members of the scraper frame which are connected at their forward ends by the draft timber 8 having the usual clevis 9 for attaching the draft animals. The rear ends of the timbers 6 and 7 are connected by the cross timber 10, which is preferably connected to the timber 7 by a loose joint—as, for example, the hook 11 and staple 12. The cross piece 10 is connected to the timber 6 by the diagonal frame piece 13, and cross pieces 14 are secured to the timbers 6 and 13. The frame member 6 extends rearwardly beyond the member 7 and carries on the extended portion vertically adjustable land-sides 15, which slide in keepers 16, and said land-sides are connected by the cross bar 17 to which is pivotally secured a lifting lever 18 pivoted on the frame member 6 and by means of which the land-sides may be raised. Said land sides have slots 15ª and threaded studs 19 pass through these slots and are provided with the nuts 20 having shanks 21. By means of the lever 18 the land-sides may be lifted to any desired position, and by tightening up the nuts they may be locked in their adjusted position.

A scraper 22 is secured to the scraper frame parallel to the diagonal frame timber 13, said scraper being preferably made of steel, of suitable width and curved after the manner of a plow share. The scraper frame carries at the outer corner of its front end the plow 23, which clears a furrow for a gage wheel 24 and the point of the scraper. I prefer to employ two of these wheels, as shown in dotted lines in Fig. 1. The one at the outer corner serves as a gage wheel and runs in the furrow made by the plow 23. Said wheels are mounted in pivoted hangers 24, and the upper ends of the latter are pivoted to the levers 26 by the depression of which the front end of the scraper frame may be raised to lift the point of the plow free of the ground for transportation, in which position it may be locked by pins inserted through holes in the hangers.

The truck frame is substantially triangular in form, being composed of three frame pieces, 27, 28, 29, the first two being connected by the cross piece 30. Said frame is intended to fit within the space inclosed by the scraper frame members 6, 10 and 13, and is provided with standards 31 separated to form slide ways to receive the cross pieces 14. On the truck frame member 29 bell crank levers 32, 33 are pivoted, whose short members may carry anti-friction rollers 34 which are adapted to engage the cross piece 10 of the scraper frame at opposite sides thereof.

The scraper is shown in one operative position in Fig. 3. In said figure the scraper frame is lowered and the scraper stands in a horizontal plane. In this position the scraper frame may be confined by pins inserted in the holes 36.

In Fig. 4 the machine is shown in position for transportation, the levers 32 being depressed, thus lifting the rear end of the scraper frame, in which position it may be supported by pins thrust through the holes 37 in the standards 31. In passing an obstruction or working upon a bank of earth of greater depth than the scraper would move at one cut, the frame may be tilted into an oblique position, as shown in Fig. 5, by manipulating the lever 33. It is intended that the landsides shall follow the cut of the colter point, thus steadying the machine and preventing its swaying laterally when in use.

One of the advantages of my construction is that the truck frame is arranged within the scraper frame. The truck wheels are between the land-side and the scraper and travel behind the scraper so that the machine may be operated close to a ditch, wall or other fixed obstruction. This is a distinct improvement over that type wherein the wheels travel outside of the path of the scraper.

Obviously, some of the details of construction may be varied, and without limiting my invention, therefore, to these precise structural features,

I claim—

1. In a machine of the class described, the combination with a truck frame having supporting and carrying wheels, of an independently movable scraper frame mounted thereon and having the scraper arranged diagonally thereof in front of the truck wheels and extending beyond the truck frame on the furrow side, and a land-side also external to the truck frame and means for raising and lowering the scraper frame with reference to the truck frame, substantially as described.

2. In a machine of the class described, the combination with a wheeled truck of substantially triangular form, a scraper frame having a scraper arranged diagonally thereof, the truck being adapted to enter the scraper frame and support the same, guides on the truck frame adapted to embrace the members of the scraper frame and lifting levers on the truck frame adapted to bear on the scraper whereby to elevate the latter, substantially as described.

3. In a machine of the class described, the combination with a wheeled truck, of a scraper frame mounted thereon, said frame being substantially rectangular in form and the frame timbers being loosely connected at the rear over the heel of the scraper whereby to permit a tilting of the scraper frame upon the truck, substantially as described.

4. In a machine of the class described, the combination with a wheeled truck, of a scraper frame mounted thereon and having a scraper arranged in front of the truck wheels and projected at its ends beyond said wheels respectively, and an adjustable land-side and means for locking said land-side in its adjusted position, substantially as described.

5. In a machine of the class described, the combination with a scraper frame having a scraper, a colter and land-side, of a combined gage and carrying wheels arranged at the front corners of said frame, substantially as described.

6. In a machine of the class described, the combination with a wheeled truck having bell crank levers pivotally connected thereon, of a scraper frame adjustably mounted upon the truck frame, and said levers being adapted to bear on opposite sides of said frame whereby the latter may be lifted vertically or tilted at will into an oblique position, substantially as described.

7. In a machine of the class described, the combination with a wheeled truck, of a scraper frame mounted thereon and adjustable with relation thereto, said scraper frame having a gage wheel at its outer front corner and a plow adapted to clear a furrow in advance of said gage wheel, substantially as described.

JOHN HEUERMANN.

Witnesses:
N. M. BOND,
S. T. MANN.